(12) United States Patent
Magnano et al.

(10) Patent No.: US 8,950,647 B2
(45) Date of Patent: Feb. 10, 2015

(54) SYSTEM FOR ASSEMBLY OF A COMPONENT ON A MOTOR-VEHICLE BODY STRUCTURE

(75) Inventors: Nunzio Magnano, Turin (IT); Francesco Di Mino, Turin (IT)

(73) Assignee: Comau S.p.A., Grugliasco (Torino) (IT)

( * ) Notice: Subject to any disclaimer, the term of this patent is extended or adjusted under 35 U.S.C. 154(b) by 230 days.

(21) Appl. No.: 13/473,689

(22) Filed: May 17, 2012

(65) Prior Publication Data

US 2013/0031778 A1 Feb. 7, 2013

(30) Foreign Application Priority Data

Aug. 1, 2011 (EP) .................................... 11176142

(51) Int. Cl.
*B23K 37/04* (2006.01)

(52) U.S. Cl.
CPC ......... *B23K 37/0443* (2013.01); *B23K 37/0408* (2013.01); *B23K 37/0426* (2013.01); *B23K 2201/006* (2013.01)
USPC ............................ 228/43; 228/44.3; 228/49.1

(58) Field of Classification Search
None
See application file for complete search history.

(56) References Cited

U.S. PATENT DOCUMENTS

| | | | | |
|---|---|---|---|---|
| 5,123,161 | A * | 6/1992 | Kubo et al. ...................... | 29/784 |
| 5,143,270 | A * | 9/1992 | Hamada et al. ................ | 228/4.1 |
| 5,184,766 | A * | 2/1993 | Takahashi et al. ............. | 228/4.1 |
| 5,267,683 | A * | 12/1993 | Hamada et al. ................ | 228/4.1 |
| 5,400,943 | A * | 3/1995 | Rossi ............................. | 228/6.1 |
| 5,940,961 | A * | 8/1999 | Parete ............................. | 29/784 |
| 5,943,768 | A * | 8/1999 | Ray ................................. | 29/822 |
| RE36,541 | E * | 2/2000 | Rossi ............................. | 228/6.1 |
| 6,438,842 | B1 * | 8/2002 | Raami .......................... | 29/897.2 |
| 6,467,675 | B1 * | 10/2002 | Ozaku et al. .................. | 228/175 |
| 6,493,930 | B1 * | 12/2002 | Raami ............................. | 29/783 |
| 2003/0057256 | A1 * | 3/2003 | Nakamura et al. ........... | 228/49.1 |
| 2003/0115746 | A1 * | 6/2003 | Saito et al. ...................... | 29/783 |
| 2005/0017057 | A1 * | 1/2005 | Motomi et al. ............... | 228/212 |
| 2005/0035175 | A1 * | 2/2005 | Nakamura et al. ........... | 228/44.3 |
| 2006/0179628 | A1 | 8/2006 | Sturm | |
| 2006/0236518 | A1 * | 10/2006 | Baulier ........................... | 29/430 |
| 2006/0242823 | A1 | 11/2006 | Kilibarda | |
| 2006/0245901 | A1 * | 11/2006 | Yamaoka et al. ............. | 414/692 |
| 2008/0116247 | A1 * | 5/2008 | Kilibarda ....................... | 228/212 |

(Continued)

FOREIGN PATENT DOCUMENTS

| | | |
|---|---|---|
| DE | 101 64 409 A1 | 12/2001 |
| DE | 100 61 309 A1 | 6/2002 |
| EP | 1 918 182 A1 | 5/2008 |

*Primary Examiner* — Kiley Stoner
(74) *Attorney, Agent, or Firm* — Young Basile Hanlon & MacFarlane P.C.

(57) ABSTRACT

Disclosed herein are systems for assembly of a component, in particular a roof panel, on a motor-vehicle body structure. One system comprises a device designed to clamp the component on the body structure in the proper position; a center for welding the component on the body structure; and a conveying line for carrying to and from the welding center a succession of the body structures. The clamping device is provided with means for gripping the component and comprises first manipulator means for bringing the device into connection with the component in a pick-up position according to a predetermined mutual positioning, and for carrying the device connected to the component to a body structure that is located in a position on the conveying line, upstream of the welding center, for constraining it to the body structure according to a mutual positioning whereby the component is in the proper position of assembly.

14 Claims, 7 Drawing Sheets

(56) References Cited

U.S. PATENT DOCUMENTS

| | | | |
|---|---|---|---|
| 2008/0148546 A1* | 6/2008 | Monti et al. | 29/525.14 |
| 2008/0295335 A1* | 12/2008 | Kilibarda et al. | 29/897.2 |
| 2009/0050679 A1* | 2/2009 | Gauggel | 228/212 |
| 2009/0245930 A1* | 10/2009 | Baulier et al. | 403/321 |
| 2011/0011918 A1* | 1/2011 | Kelley | 228/6.1 |
| 2011/0265301 A1* | 11/2011 | Kilibarda | 29/407.01 |
| 2012/0137490 A1* | 6/2012 | Kweon et al. | 29/428 |

* cited by examiner

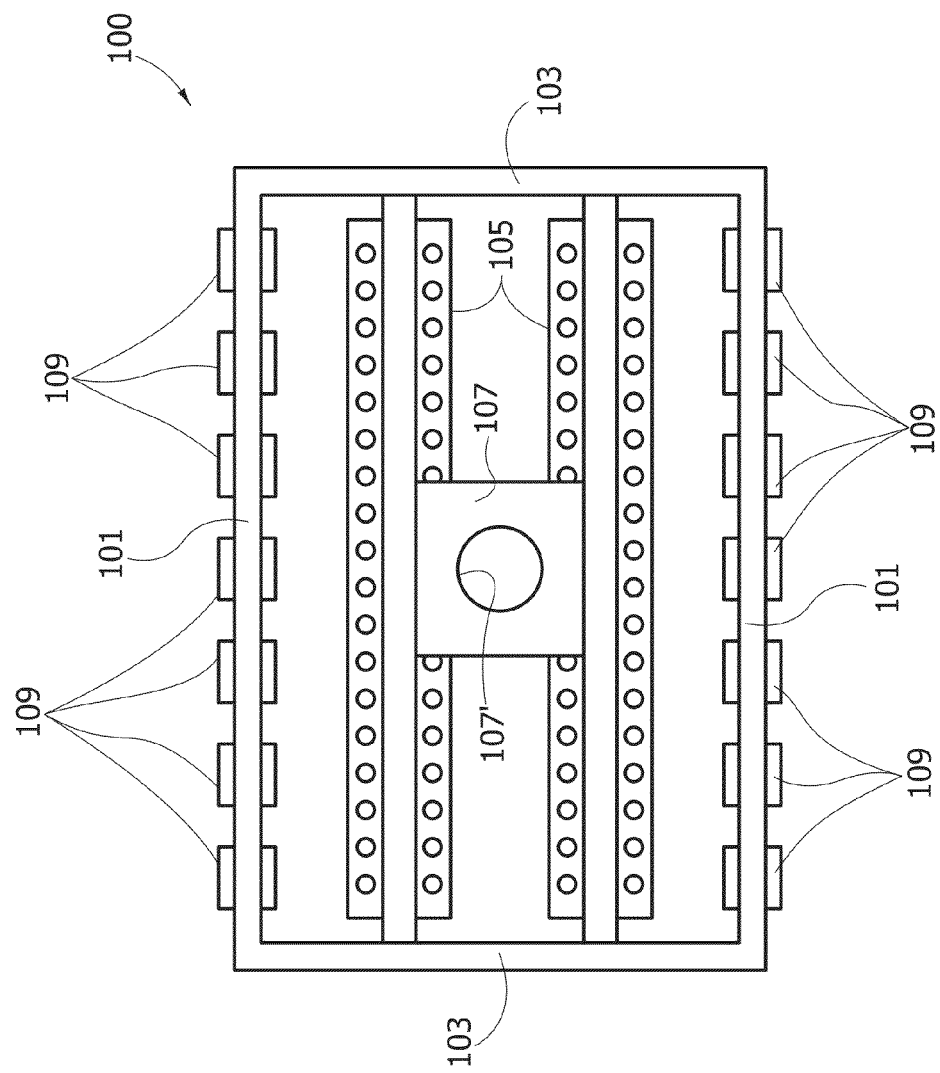

SYSTEM FOR ASSEMBLY OF A COMPONENT ON A MOTOR-VEHICLE BODY STRUCTURE

FIELD OF DISCLOSURE

The embodiments herein relate in general to a system for the assembly of a component on a vehicle body structure.

SUMMARY

The embodiments herein relate to a system for assembly of a component on a motor-vehicle body structure. One embodiment comprises a device designed to clamp the component on the body structure in the proper position of assembly, a centre for welding or fixing the component on the body structure and a conveying line for carrying to the welding centre a succession of body structures and for carrying out of the welding centre the body structures with the component assembled thereon.

It should be noted that in the present description, as in the annexed claims, by "body structure" is to be understood a body of a motor vehicle or any subassembly thereof, such as for example a chassis.

The object of the present disclosure is to provide an assembly system that will enable carrying-out of a process of assembly characterized by shorter cycle times with a structure that is simple and of contained cost. In addition, a further object of the present disclosure is to provide an assembly system capable of operating on different models of motor vehicle.

The system described herein is characterized in that the clamping device is provided with means for gripping the component and in that it comprises first manipulator means for bringing the device into a condition of connection with the component in a pick-up position, according to a predetermined mutual positioning, and for carrying the device connected to the component to a body structure that is located in a position, on the conveying line, upstream of the welding centre, in order to constrain it to the body structure according to a mutual positioning, whereby the component comes to occupy the proper position of assembly.

The assembly system described herein is configured for positioning the component in its correct position of assembly with respect to the body structure, already in a position upstream of the welding centre, in such a way that in the centre only welding of the component is to be performed and not also its positioning. As will be seen in what follows, this enables reduction of the cycle times of the system, since the times for positioning the component are comprised within a separate cycle, carried out upstream of the welding centre.

According to the system, the gripping and clamping device, once it has been connected to the component and has been constrained to the body structure, is conveyed together with the latter from the conveying line up to the welding centre. The system comprises second manipulator means designed to remove the device from the body structure, after completion of the operations of welding of the component on the structure. In various embodiments, the device is prearranged for being supported by the body structure itself.

As will be seen in detail in what follows, in various embodiments, the system comprises a storage site, onto which the gripping and clamping device is released after use and which is prearranged for interfacing with the first and second manipulator means. In various embodiments, the first manipulator means are designed to pick up the device from the storage site, for assembly of a new component, whereas the second manipulator means are designed to release the device onto the site at the end of the operations of welding of the component.

In various embodiments, the storage site comprises a structure that extends along the conveying line of the system and is such as to interface, on its side upstream (with respect to the direction of advance of the body structures along the conveying line), with the first manipulator means, and, on its side downstream (with respect to the direction of advance of the body structures along the conveying line), with the second manipulator means. Furthermore, the storage site comprises means for conveying the device between the two sides referred to above, upstream and downstream.

As will be seen more clearly in what follows, during operation of the system described herein a closed path of the gripping and clamping device is determined which comprises a first stretch from a position upstream of the welding centre as far as within the centre, where the device is used for assembling the component and is conveyed by the same conveying line as that for the body structures; and a second stretch from the output of the welding centre up to the loading station, where the device is conveyed by itself, off the conveying line for the body structures, to be made available for assembly of a new component.

Further advantageous characteristics of the disclosure are referred to in the annexed dependent claims.

BRIEF DESCRIPTION OF THE DRAWINGS

The disclosure will be now described, purely by way of non-limiting example, with reference to the annexed drawings, in which:

FIG. 7 illustrates an example of clamping device used in the assembly system described herein.

DETAILED DESCRIPTION OF EMBODIMENTS

Figure 1:
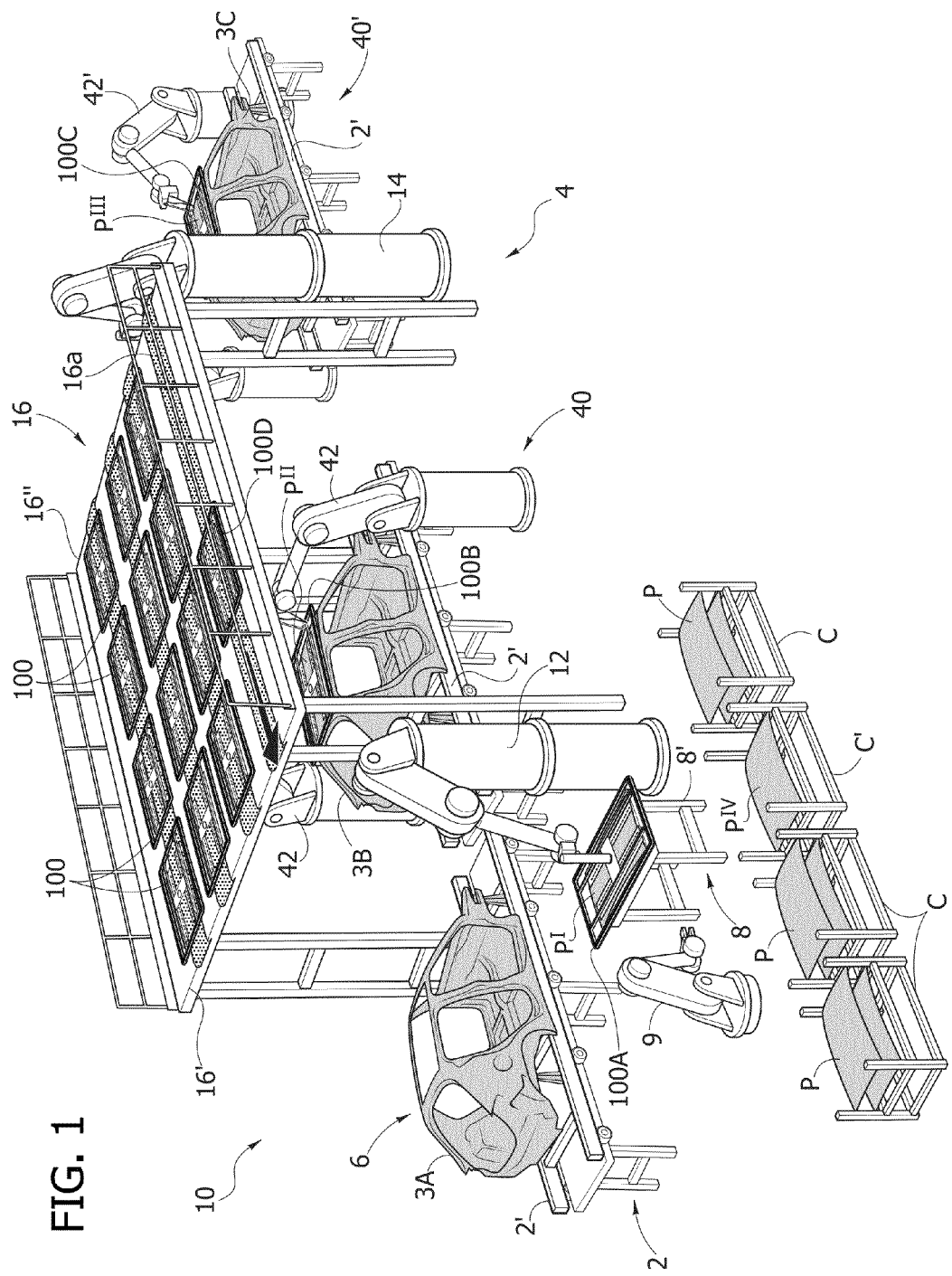
FIG. 1 is a schematic illustration of an embodiment of the assembly system described herein.

Illustrated in the ensuing description are the various specific details aimed at providing an in-depth understanding of the embodiments. The embodiments can be provided without one or more specific details, or with other methods, components, materials, etc. In other cases, known structures, materials or operations are not described in detail so that various aspects of the disclosure will not be obscured.

The references used are provided merely for convenience and hence do not define the sphere of protection of the embodiments.

In the ensuing description, specific reference is made to a system for assembly of a roof panel on a motor-vehicle body structure. It is, however, to be noted that the general principles referred to in what follows can apply also to systems for assembly of other types of component, enabling the same advantages that have been referred to above and that will be discussed in greater depth in what follows to be achieved.

With reference to the figures, the reference number 10 designates a system for assembly of a roof panel P (in the figures some of these are designated by PI, PII, PIII, PIV) on a motor-vehicle body structure. In general, the system comprises: a welding centre 4, where welding of the roof panel on the body structure is carried out; and a conveying line 2 for carrying a succession of body structures to the welding centre and carrying out of the welding centre the structures with the roof panel assembled thereon. It should be noted that in the centre 4 fixing of the component to the body structure could be obtained also by means of techniques other than welding, for example via riveting.

The body structure, designated as a whole by the reference number 3 (in the figures a number of body structures are represented, designated by 3A, 3B, 3C) is constituted by a plurality of elements of pressed sheet metal. In the case of the example illustrated (see in this connection FIG. 2), and without any intention herein to describe exhaustively the elements making up the structure since this is not important for the purposes of an understanding of the present system, the body structure comprises a bottom portion of chassis 3I, two opposite side panels 3II, and, at the top, cross members 3III for connecting the two side panels. A compartment 3IV for housing the roof panel on the body structure is identified by the two side panels 3II, in its transverse direction, and by the two cross members 3III, in its longitudinal direction.

Assembly of the roof panel on the body structure envisages first positioning of the roof panel in the compartment, and, subsequently, its connection, via welding, both on the side panels and on the cross members of the body structure. In the case described, the roof panel is connected to the side panels via brazing, and to the cross members via spot welding.

The conveying line 2 can be built in any one of various known ways. The example illustrated in the drawings regards the case of a line with a plurality of motor-driven rollers, governed, in a way in itself known, by one or more motors and corresponding transmissions (not visible in the drawings). The structure of each body rests on a pallet 2', which is provided with supports on which the body structure rests according to a precise and predetermined positioning.

The welding centre 4 is prearranged for receiving the body structure and clamping it in a predetermined position via referencing and clamping members (not visible in the drawings) provided within the welding centre. The type of the members can vary according to the conveying means used on the conveying line of the system.

Provided within the welding centre are one or more welding robots. In the example illustrated in the figures, the welding operations have been divided between two successive stations: in the first station, designated in the figures by the reference number 40, the connection of the roof panel to the side panels is carried out via brazing, whilst in the second station, designated in the figures by the reference number 40', the connection of the roof panel to the cross members is performed via spot welding.

The first station comprises two robots 42, set on either side of the conveying line 2 and each designed to operate on the longitudinal side of the roof panel corresponding thereto. The robots are designed to carry out operations of brazing and can present any configuration of a known type that may be suitable for the purpose.

The second station comprises, instead, two robots 42', set on one and the same side of the conveying line 2, at a distance from one another along the same conveying line, and each designed to carry out welding of the roof panel to the cross member 3III closest to it.

As mentioned previously, in the assembly system described herein the roof panel is referenced and clamped in the proper position of assembly on the body structure before this is brought into the welding centre.

This is made possible thanks to the innovative configuration that will be described hereinafter.

In various embodiments, as in the one illustrated, the system comprises, on the conveying line 2, a station 6 for fitting the roof panel on the body structure (which, to all effects, can simply be a position on the conveying line 2 on which parking of the body structures is envisaged), which is located upstream of the welding centre with respect to the direction of advance of the body structures along the conveying line 2. At the side of the fitting station, the system comprises a loading station 8, where the roof panel to be assembled is loaded, the roof panel being carried via a robot 9 designed to pick up the roof panel from one of the containers C, C' set at the side of the loading station. The loading station 8 can be of any known type and substantially has the sole purpose of defining, as will be seen in what follows, a position for picking up the component.

In various embodiments, as in the one illustrated, the loading station 8 comprises a platform 8' that defines at the top a resting surface on which the roof panel is set. Provided on the resting surface are means (not illustrated) designed to constitute a reference for positioning the roof panel on the resting surface in a precise and predetermined way.

The assembly system further comprises a device 100 (illustrated in the figures are various units of the device, some of which are designated by 100A, 100B, 100C, 100D), designed to clamp the roof panel in the proper position of assembly on the body structure. Illustrated in the figures is an example of the device, which will, however, be described in greater detail hereinafter.

The system comprises first means 12, which in the example illustrated are represented by a manipulator robot with six degrees of freedom, designed to carry the device into the loading station 8, where the roof panel has previously been loaded, and to set the device in a condition of mutual connection with the roof panel. In particular, the device is set in a predetermined relative position with respect to the roof panel, and is connected thereto so that they will both be displaceable, fixed with respect to one another. Once the device is in the condition of mutual connection with the roof panel, the first means are designed to carry the device, and the roof panel connected thereto, to a body structure that is located in the fitting station. In the station, the device is constrained to the body structure according to a mutual positioning whereby the roof panel comes to occupy the proper position of assembly, in the compartment 3IV defined at the top by the body structure itself. Consequently, by means of the device, the roof panel comes to occupy, clamped on the body structure, the correct position of assembly and can now displace therewith as far as the welding centre.

The structure of the first means 12, as well as its control architecture, is not described in detail herein in so far as they can be provided in any way known to the person skilled in the art, and their specific configurations are in themselves not important with respect to the innovations introduced by the system described herein. In preferred embodiments, to make sure that the positioning of the roof panel is carried out correctly, the first means are provided with sensor devices designed to detect the position of the roof panel with respect to that of the compartment in which it is housed in the body structure, and the control unit of the first means is designed to guide the operations of positioning of the roof panel according to the information received from the sensor devices. The sensor devices can, for example, comprise a video camera or else "mechanical" members, such as for example feeler elements. The same sensor devices, or similar sensor devices, can be used for carrying out proper positioning of the device 100 on the roof panel.

As will be seen in detail hereinafter, the clamping device has means for connecting the roof panel to itself in a temporary way. The means can, for example, envisage suction elements or else magnetic elements, such as for example electromagnets. Furthermore, as will be seen in detail hereinafter, in various embodiments the clamping device is prearranged for being supported by the body structure itself. In this case, the weight of the device must be such as not to subject the body structure to any significant deformation in so far as there would otherwise arise the risk of jeopardizing proper assembly of the roof panel. Further embodiments can, instead, envisage that the device be prearranged for unloading, at least partially, its weight directly or indirectly on the pallet 2' (or on any other means having the function of conveying the car-body structures along the conveying line 2), so as to lighten or even eliminate the weight weighing on the body structure. For the purpose, the pallet can present corresponding supporting formations, prearranged for taking up and supporting the device.

Whether the device is totally supported by the body structure or whether appropriate supports are instead provided on the pallet, as mentioned above, once the device is constrained to the body structure, the device, and the roof panel connected thereto, can be moved together with the body structure, and along with the structure can advance, by means of the conveying line 2, from the fitting station up to the welding centre. The roof panel consequently arrives in the welding centre already in the correct position of assembly, and, as will be seen in what follows, as soon as the pallet 2' is clamped in position the welding operations can immediately start. The means via which the device is gripped to the body structure can be of any known type in the context here of interest and are not consequently described in detail.

At the welding centre, the system comprises second means 14—in the figures represented by a manipulator robot with six degrees of freedom—designed to pick up the clamping device from the body structure, as soon as the operations of welding on the roof panel are terminated. In the embodiment illustrated, the second means are set in the second welding station 40'. The structure of the second means 14, as likewise their control architecture, are not described in detail herein in so far as they can be built in any way known to the person skilled in the art and their specific configurations in themselves are not important with respect to the innovations introduced by the system described herein.

It should be noted that the division of the welding operations between two successive stations is rendered possible in that the device for clamping the roof panel is able, whilst it keeps the roof panel in the proper position of assembly on the body structure, to travel at the same time together with the structure. The device hence enables displacement of the body structure between the two welding stations without any loss of the geometry of the roof panel in the passage from one station to the next. Without such a clamping device, which is mobile together with the structure, displacement of the body structure between the two successive welding stations would necessarily require, instead, removal of the device between one welding step and another, with the consequent loss of the geometry of the roof panel. The two stations of the welding centre are characterized by the low number of robots and tools, and are hence constructively simpler and easier to manage as compared to a single station for both of the welding steps.

In various embodiments, as in the one illustrated, the system comprises a storage site, which is prearranged for interfacing with the first and second means and is designed to receive the clamping device 100. In various embodiments, the first means are designed to pick up the device from the storage site in order to fit a new roof panel on the body structure, whereas the second means are designed to release the device on the site after having removed it from the body structure.

In various embodiments, as in the one illustrated, the storage site has an overhead structure 16, which is set above the welding centre. The overhead structure interfaces, on a first side 16' thereof, the one set upstream with respect to the direction of advance of the body structures, with the first means, and on its opposite side 16", the one set downstream with respect to the direction of advance of the body structures, with the second means. The first means are designed to pick up the device from the side upstream of the storage site, whereas the second means are designed to release the device on the side downstream of the site.

In various embodiments, as in the one illustrated, the storage site comprises means for conveying up to the side upstream the device that has been released on the side downstream by the second means so that the device will be again picked up by the first means of the system for assembly of a new roof panel. In various preferred embodiments, the means comprise a conveyor 16a, which is carried by the overhead structure 16 and extends in a direction substantially parallel to the direction of advance of the conveying line 2.

In various embodiments, as will be seen in what follows, the system comprises a number of units of the clamping device 100, in order to guarantee a greater productivity of the system. In the example illustrated, the number of the units is four.

An example of operation of the assembly system described herein will be illustrated hereinafter.

FIG. 1 illustrates an instant of an operating cycle of the system. As may be seen in the figure, three body structures 3A, 3B and 3C are set in the three successive stations 6, 40, 40', respectively, of the assembly system: the first body structure 3A is located in the fitting station 6, the second body structure 3B in the first welding station 40, and the third body structure 3C in the second welding station 40'.

The system envisages four clamping devices:
  a first device 100A for assembly of a first roof panel PI on the first body structure 3A;
  a second device 100B for assembly of a second roof panel PII on the second body structure 3C;
  a third device 100C for assembly of a third roof panel PIII on the third body structure 3C; and
  a fourth device 100D for assembly of a fourth roof panel PIV on a fourth body structure (not visible in the drawings).

Figure 2:
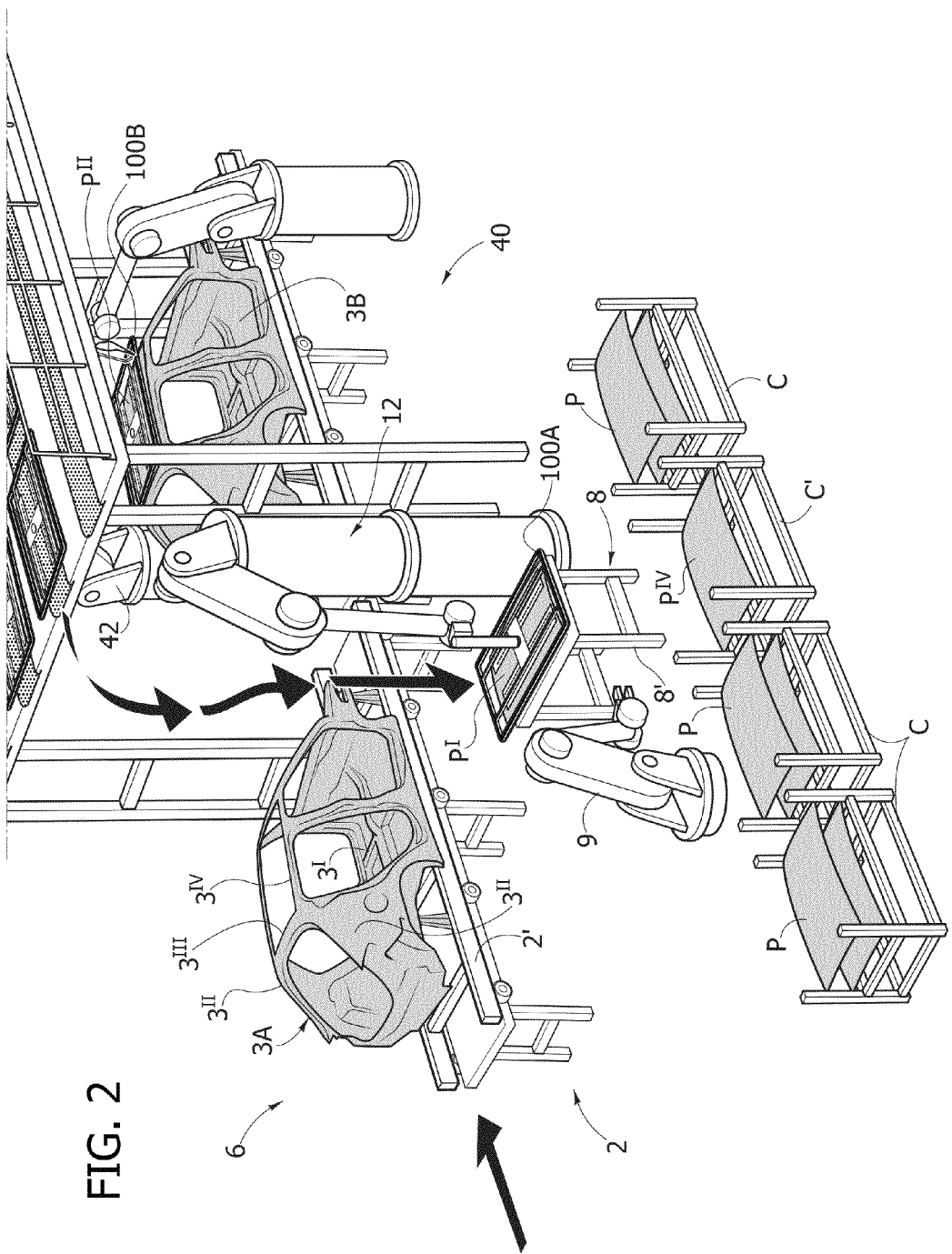
FIG. 2 is a detailed view of the system of FIG. 1.
Figure 3:
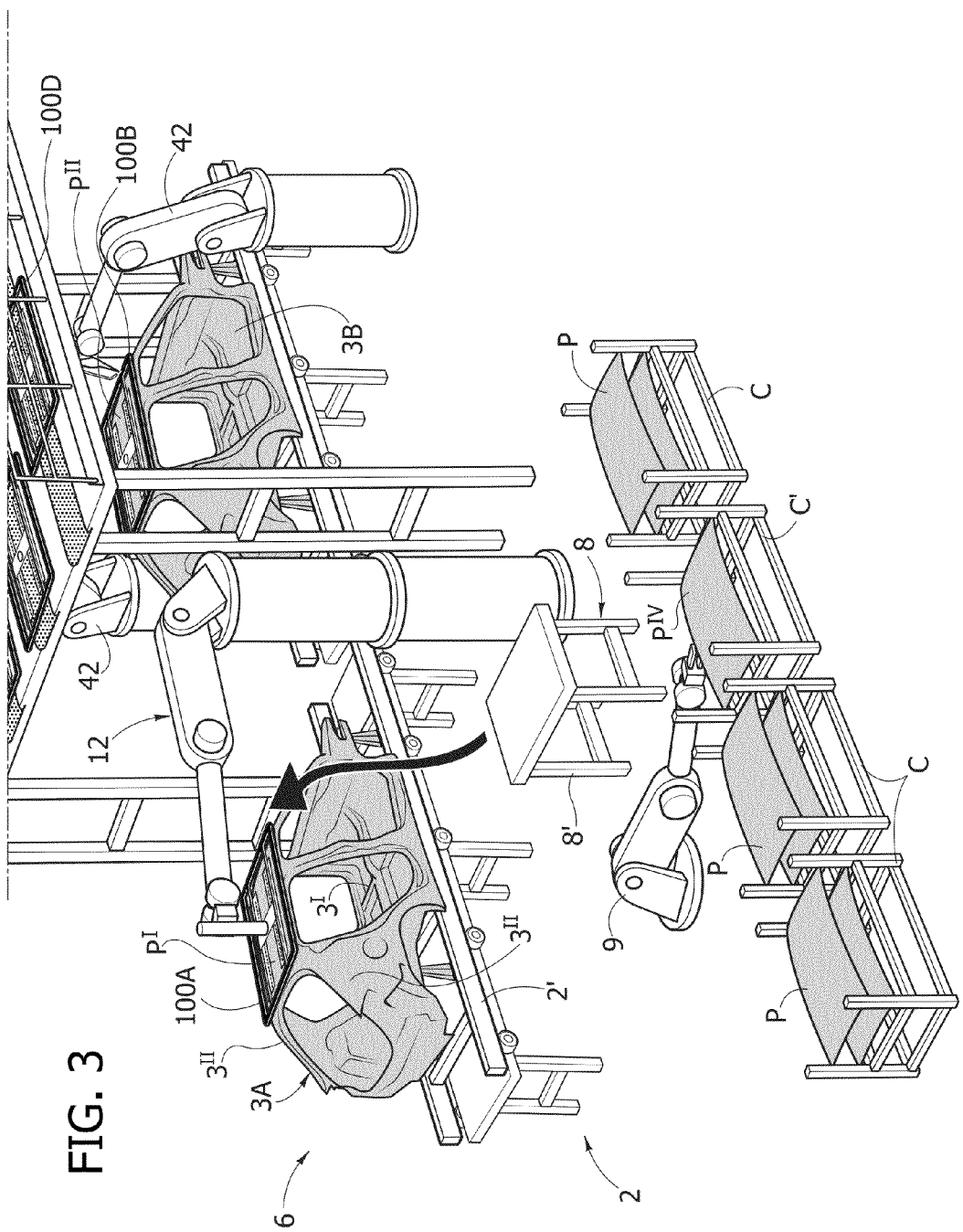
FIG. 3 is a detailed view of the system of FIG. 1.
Figure 4:
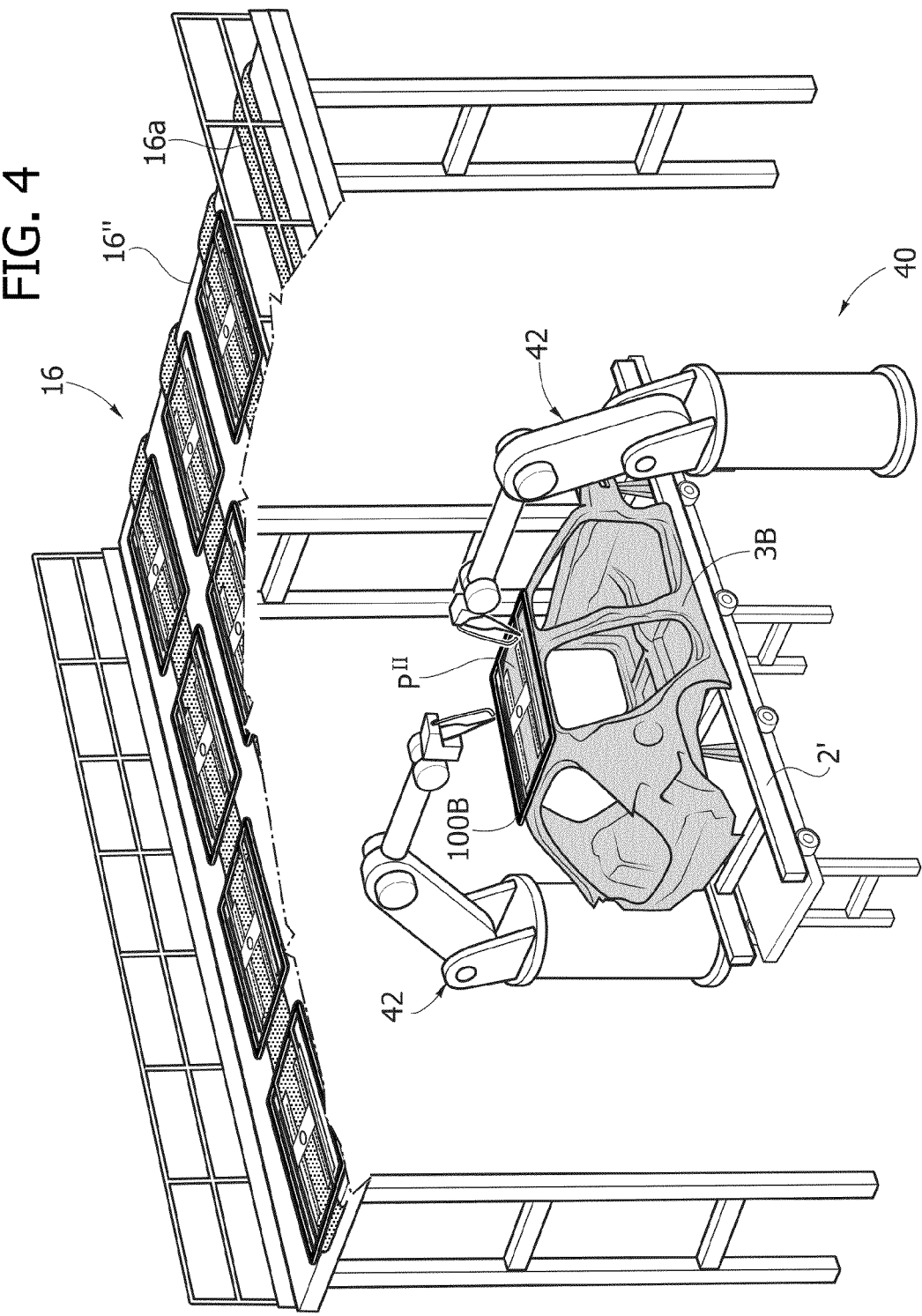
FIG. 4 is a detailed view of the system of FIG. 1.

With reference to FIG. 2, during the operating cycle here considered, the first device 100A is picked up by the first means 12 from the storage site 16 and is taken into the loading station 6 to be connected to the first roof panel PI, which has been previously loaded onto the station via the robot 9. The first means then carry the first device 100A with the first roof panel connected thereto to the first body structure 3A, and the first device is then clamped on the body structure so that the first roof panel comes to occupy, with respect to the first body structure, the correct position of assembly.

In the same cycle considered above, in the first welding station 40 the welding robots 42 make the lateral seam welds for connecting the second roof panel PII to the second body structure 3B, whilst the roof panel is kept in the correct position of assembly by the second device 100B. Once again in the same cycle considered above, in the second welding station 40' the welding robots make the welds for connecting the third roof panel PIII to the cross members of the third body structure 3C, whilst the roof panel is kept in the correct position of assembly by the third device 100C, and, once the welding operation is through, the second means 14 remove the device from the body structure and release it on the side downstream 16" of the storage site. As represented in FIG. 1, once again during the cycle here considered, the fourth clamping device 100D, which has been released in a preceding cycle on the side downstream 16" of the storage site, is now conveyed up to the side upstream 16' of the site.

Next, the first body structure 3A goes into the first welding station 40, the second body structure 3B into the second welding station 40', the third body structure 3C exits from the assembly system, whilst the fourth body structure is brought into the fitting station 6.

In the next cycle, with the same modalities as those described above, the fourth roof panel is positioned, via the fourth device, in the proper position of assembly on the fourth body structure, whilst the first and second roof panels undergo welding, respectively, in the welding stations 40 and 40'.

The operating cycles then follow one another in the way referred to above, for all the roof panels to be assembled. The system is of course prearranged for being controlled automatically by means of an electronic control unit, according to a technique in itself known, which activates the various component parts of the system automatically in order to obtain the desired operating cycle.

As emerges from the foregoing, within one and the same operating cycle of the system, while welding of a first roof panel on a first body structure is performed in the welding centre, in the meantime a second roof panel is already set in the proper position of assembly on a second body structure in such a way that, as soon as the second body structure arrives in the welding centre, the welding operations can immediately start. In this way, the times of the operations for positioning the roof panel do not affect the cycle time of the system in so far as they are comprised within a cycle separate from the welding cycle proper.

In view of the foregoing, the reduction of the cycle times that the assembly system makes possible as compared to systems of a conventional type is consequently evident.

As has been seen, in the operation of the system described herein a closed path is determined for each clamping device, comprising:

a first stretch from a position upstream of the welding centre up to within the centre, where the device is used for assembling the roof panel and is conveyed by the same line as that for conveying the body structures; and a second stretch from output of the welding centre up to the loading station, where the device is conveyed by itself, off the conveying line for the body structures, to be made available for assembly of a new roof panel.

As has been seen above, since the clamping device, after being picked up by the body structure on which the roof panel has been assembled, cannot be immediately made available for assembly of a new roof panel in the immediately subsequent cycle since it still has to be brought back again to the loading station, the system envisages, for each operating cycle, in addition to the clamping devices that, in the cycle in progress, are located in the fitting station and in the welding centre, a further clamping device to be made immediately available for the next cycle. As has been seen above, in preferred embodiments, the system moreover envisages a storage site on which the clamping device currently not being used is set waiting to be picked up by the first means, being carried there by the second means at the end of a previous cycle.

In various embodiments, as in the one illustrated, the system is configured so as to be able to operate on different models of motor vehicle. In this case, the system comprises for each model of motor vehicle at least one container of roof panels, and, in the same way, the storage site is divided into a number of sectors corresponding to the number of different models, each sector interfacing with the first and second means of the system and presenting means for conveying the individual devices from the second means to the first means.

In this connection, the figures represent a system prearranged for assembling four different models; the system comprises, in fact, four containers, each designed to provide the roof panels of a respective model, and in the same way the overhead structure comprises four conveyors 16a, which run parallel to one another, each connecting the side downstream 16" to the side upstream 16', and are each designed to receive the devices for the roof panels of a respective model. According to the specific model to be assembled, via the robot 9, from one of the containers the corresponding roof panel is picked up, and, via the first means 12, from the storage site the device 100 for the roof panel is picked up. FIG. 1 illustrates assembly of a model of motor vehicle for which the roof panels PI, PII, PIII, PIV of the container C' are used, as well as the clamping devices 100A, 100B, 100C and 100D, which, during operation, are released on the first belt conveyor 16a. It should be noted that, in the example illustrated, for each model of motor vehicle the system envisages four clamping devices, which are located all on the storage site—on the conveyor as illustrated in FIG. 1 or else in an area of the site purposely equipped to receive the devices—when the assembly of another model is in progress.

The assembly system described herein can thus be rendered flexible and capable of operating on a number of models of motor vehicle, albeit maintaining the same configuration that has been described previously. It should on the other hand be noted how passage from one model to another does not require any additional operation (and hence additional time) with respect to the normal operating process of the system.

Figure 5:
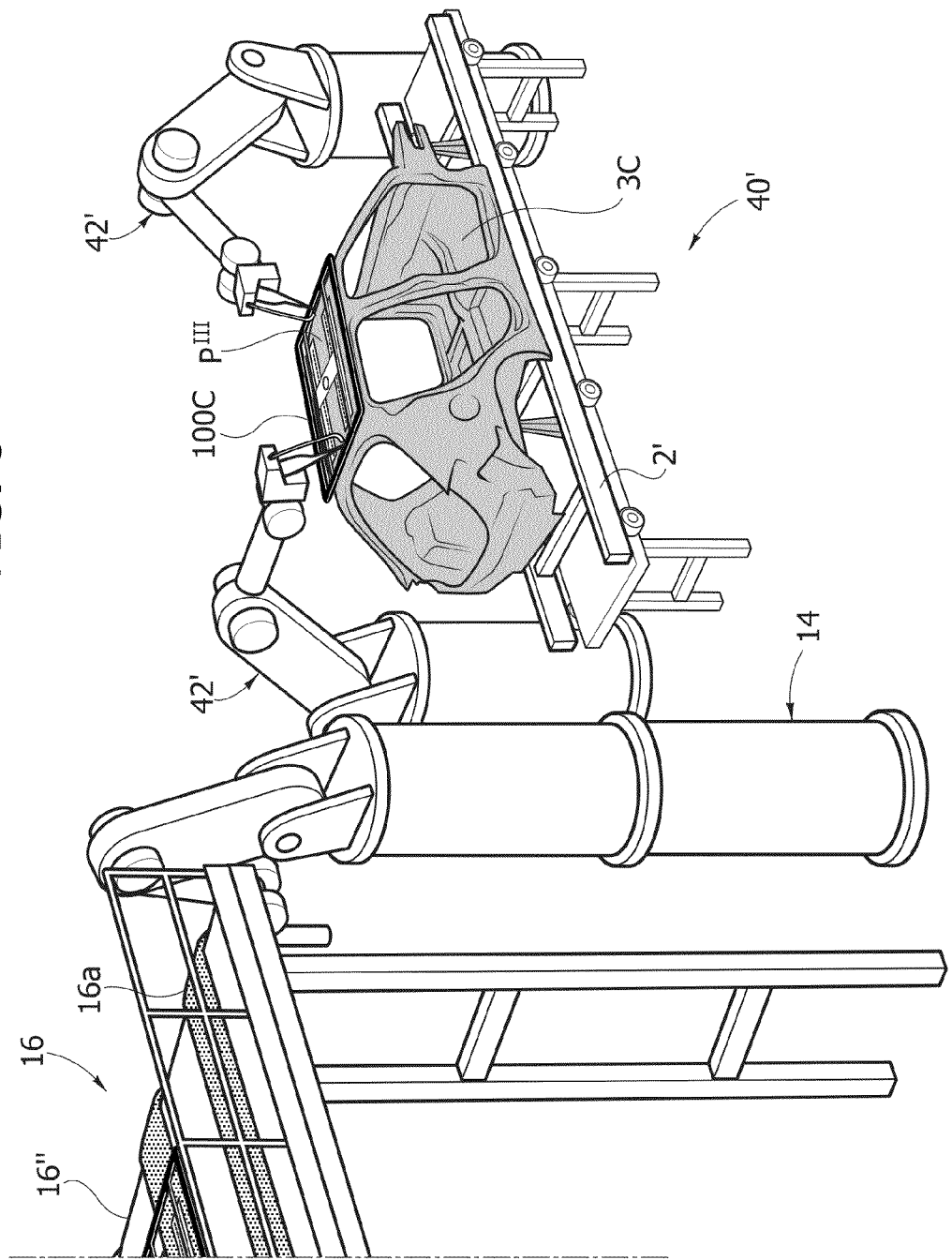
FIG. 5 is a detailed view of the system of FIG. 1.
Figure 6:
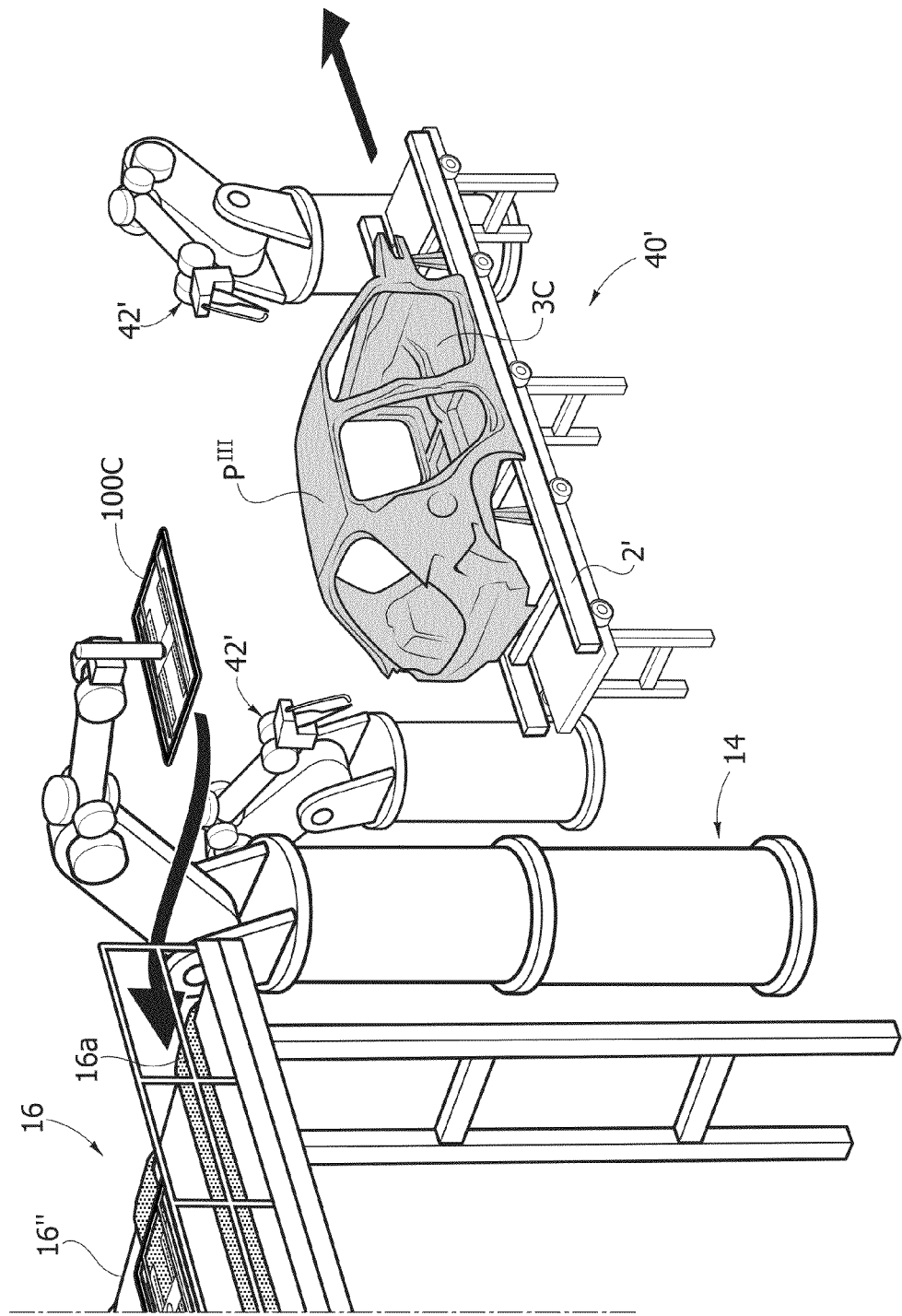
FIG. 6 is a detailed view of the system of FIG. 1.

As mentioned previously, in various preferred embodiments, as in the one illustrated, the referencing and clamping device is prearranged for being supported by the body structure itself. FIG. 5 illustrates an example of such a device.

With reference to FIG. 5, the device comprises a framework having a generic framed load-bearing structure, defined by two longitudinal bars 101 connected together, at the ends, by two transverse bars 103. Suspended from the frame are two attachment portions 105 provided with suction pads, for connection of the device to the roof panel, which extend in the longitudinal direction of the frame and are set substantially symmetrical to one another with respect to an axis of longitudinal symmetry of the frame itself. Furthermore, the attachment portions are shifted towards the centre of the frame and set at a distance from the longitudinal bars 101 in order to leave between each of them and the corresponding bar a space through which the welding head of the robot can operate on the corresponding longitudinal edge of the roof panel. In the same way, the frame is such as to enable the welding head of the robot to operate on the front and rear portions of the roof panel.

An attachment plate 107 for gripping the device by the first and second means is fixed to the frame in a central position with respect to a plan view of the frame, and has an opening 107' designed to be engaged by corresponding gripping means of the first and second means.

The frame-like structure of the device is prearranged for being fitted on the body structure by being lowered from above and rested on the side panels of the structure, in a position corresponding to its longitudinal bars. For the purpose, each of the bars can envisage a row of blocks 109 projecting downwards, with respect to the condition of use of the device, which are designed to engage the top profile of the side panels. In various embodiments, the device further comprises clamping members (not illustrated) that are actuated once the device has been laid on the body structure so as to clamp it thereon and prevent any movement thereof with respect to the structure itself. As already mentioned previously, the members can be of any known type and are consequently not described herein. It should be noted that the structure of the clamping device 100 may, however, also be different from the one described and illustrated herein; for example, as already mentioned previously, the device can be prearranged for resting on supports carried by the pallet and for the purpose present a spider-like structure, provided with feet designed to rest on the supports.

In various applications, it is possible for the body structure, when entering the assembly system, to present side panels free to perform minor oscillations with respect to the bottom panel about an axis parallel to the direction of advance of the body structure along the conveying line. In this case, the device and the roof panel are found to oscillate together with the body structure itself once they are constrained thereto. In a position corresponding to the welding centre, there can then be provided guide means that act on the device whilst the body structure advances within the welding centre in order to reference it in position with respect to the bottom panel and then keep it in position during the welding operation so as to reference also the side panels of the body structure and hold them in position.

Of course, without prejudice to the principle of the disclosure, the details of construction and the embodiments may vary, even significantly, with respect to what has been illustrated herein purely by way of non-limiting example, without thereby departing from the scope of the disclosure, as defined by the annexed claims.

What is claimed is:

1. A system for assembly of a component on a body structure of a motor-vehicle comprising:
    a welding centre for welding or fixing the component on the body structure:
    a conveying line for carrying to the welding centre a succession of the body structures and for carrying out of the welding centre the body structures with the component assembled thereon:
    a gripping and clamping device, the gripping and clamping device including means for gripping the component to connect the component thereto, and configured to clamp the connected component on the body structure, and by the clamping, constrain the connected component on the body structure in a proper position of assembly, wherein the gripping and clamping device is configured to be supported by the body structure for conveyance together therewith by the conveying line:
    a first manipulator configured to bring the gripping and clamping device into a condition of connection with the component in a pick-up position, according to a predetermined mutual positioning, and for carrying the device connected to the component to a body structure that is located in a position, on the conveying line, upstream of the welding centre, for constraining the component to the body structure according to a mutual positioning whereby the component comes to occupy a proper position of assembly;
    a storage site designed to receive the gripping and clamping device, the first manipulator means being designed to pick up the gripping and clamping device from the storage site to bring the gripping and clamping device into connection with the component in the pick-up position; and
    a second manipulator means designed to pick up the device from the body structure in the welding or fixing centre or downstream thereof, after the component has been assembled thereon and to bring it back to the storage site;
    wherein the storage site comprises a structure that extends along the conveying line of the system, and is configured to interface, on a side upstream, with respect to a direction of advance of the body structures along the conveying line, with the first manipulator means, and, on a side downstream, with respect to the direction of advance of the body structures along the conveying line, with the second manipulator means, and further comprises means for conveying the device between the side upstream and the side downstream.

2. The system according to claim 1, comprising at least two gripping and clamping devices.

3. The system according to claim 1, further comprising:
    a loading station having a resting surface on which the component is set, the resting surface comprising means designed to constitute a reference for positioning the component in the pick-up position in a precise and predetermined way.

4. The system according to claim 1, wherein the gripping and clamping device has a load-bearing structure to which the means for gripping the component are fixed, the load-bearing structure presenting formations designed to engage the body structure so that the device is supported thereby.

5. The system according to claim 1 wherein the gripping and clamping device comprises:
    first means for gripping the component; and
    second means for clamping the component on the body structure.

6. The system according to claim 5 wherein the gripping and clamping device comprises:
    a load-bearing structure to which the first and second means are fixed, the load-bearing structure presenting formations designed to engage the body structure so that the gripping and clamping device is supported thereby.

7. A system for assembly of a component on a body structure of a motor-vehicle comprising:
    a gripping and clamping device designed to clamp the component on the body structure in a proper position of assembly and includes means for gripping the component;
    a welding centre for welding or fixing the component on the body structure;
    a conveying line for carrying to the welding centre a succession of the body structures and for carrying out of the welding centre the body structures with the component assembled thereon;
    a first manipulator configured to bring the gripping and clamping device into a condition of connection with the component in a pick-up position, according to a predetermined mutual positioning, and for carrying the device connected to the component to a body structure that is located in a position, on the conveying line, upstream of the welding centre, for constraining the component to the body structure according to a mutual positioning whereby the component comes to occupy a proper position of assembly;

a storage site designed to receive the gripping and clamping device, the first manipulator means being designed to pick up the gripping and clamping device from the storage site to bring the gripping and clamping device into connection with the component in the pick-up position; and a second manipulator means designed to pick up the device from the body structure in the welding or fixing centre or downstream thereof, after the component has been assembled thereon and to bring it back to the storage site;

wherein the storage site comprises a structure that extends along the conveying line of the system, and is configured to interface, on a side upstream, with respect to a direction of advance of the body structures along the conveying line, with the first manipulator means, and, on a side downstream, with respect to the direction of advance of the body structures along the conveying line, with the second manipulator means, and further comprises means for conveying the device between the side upstream and the side downstream.

8. The system according to claim 7, wherein the gripping and clamping device constrained to the body structure is configured to be conveyed by the conveying line together with the body structure.

9. The system according to claim 8, wherein the gripping and clamping device is configured to be supported by the body structure.

10. The system according to claim 7, comprising at least two gripping and clamping devices.

11. The system according to claim 7 further comprising:
a loading station having a resting surface on which the component is set, the resting surface comprising means designed to constitute a reference for positioning the component in the pick-up position in a precise and predetermined way.

12. The system according to claim 7, wherein the gripping and clamping device has a load-bearing structure to which the means for gripping the component are fixed, the load-bearing structure presenting formations designed to engage the body structure so that the device is supported thereby.

13. The system according to claim 7 wherein the gripping and clamping device comprises:
first means for gripping the component; and
second means for clamping the component on the body structure.

14. The system according to claim 13 wherein the gripping and clamping device comprises:
a load-bearing structure to which the first and second means are fixed, the load-bearing structure presenting formations designed to engage the body structure so that the gripping and clamping device is supported thereby.

* * * * *